United States Patent

Hoag

[15] 3,665,757
[45] May 30, 1972

[54] COMBINED GOLF BALL CONCENTRICITY AND COMPRESSION TESTER

[72] Inventor: Charles R. Hoag, Glenview, Ill.

[73] Assignee: International Recreation Products Inc., Skokie, Ill.

[22] Filed: Apr. 23, 1971

[21] Appl. No.: 136,713

[52] U.S. Cl. ................................. 73/94, 33/178 B
[51] Int. Cl. .......................................... G01n 3/14
[58] Field of Search ..................... 73/94; 33/178 B

[56] References Cited

UNITED STATES PATENTS 1,819,232  10/1931  Cropper ........................... 73/94
3,512,262  5/1970  Smyk ............................... 33/178 B Primary Examiner—Jerry W. Myracle
Attorney—Rummler & Snow

[57] ABSTRACT

A gauge of lightweight tubular construction for checking the concentricity of a golf ball and the compression of the same having a lever for moving a first anvil a given distance against the ball, the ball moving against a second anvil registering the ball compression against a helical spring on a dial gauge, the handle of said lever being apertured as a go-no-go ring gauge for passage of the ball therethrough as a check on ball concentricity, combined with the direct insertion of the ball therefrom into position between the anvils of the ball compression test device in preparation for a check on ball compression.

3 Claims, 5 Drawing Figures

Patented May 30, 1972
3,665,757
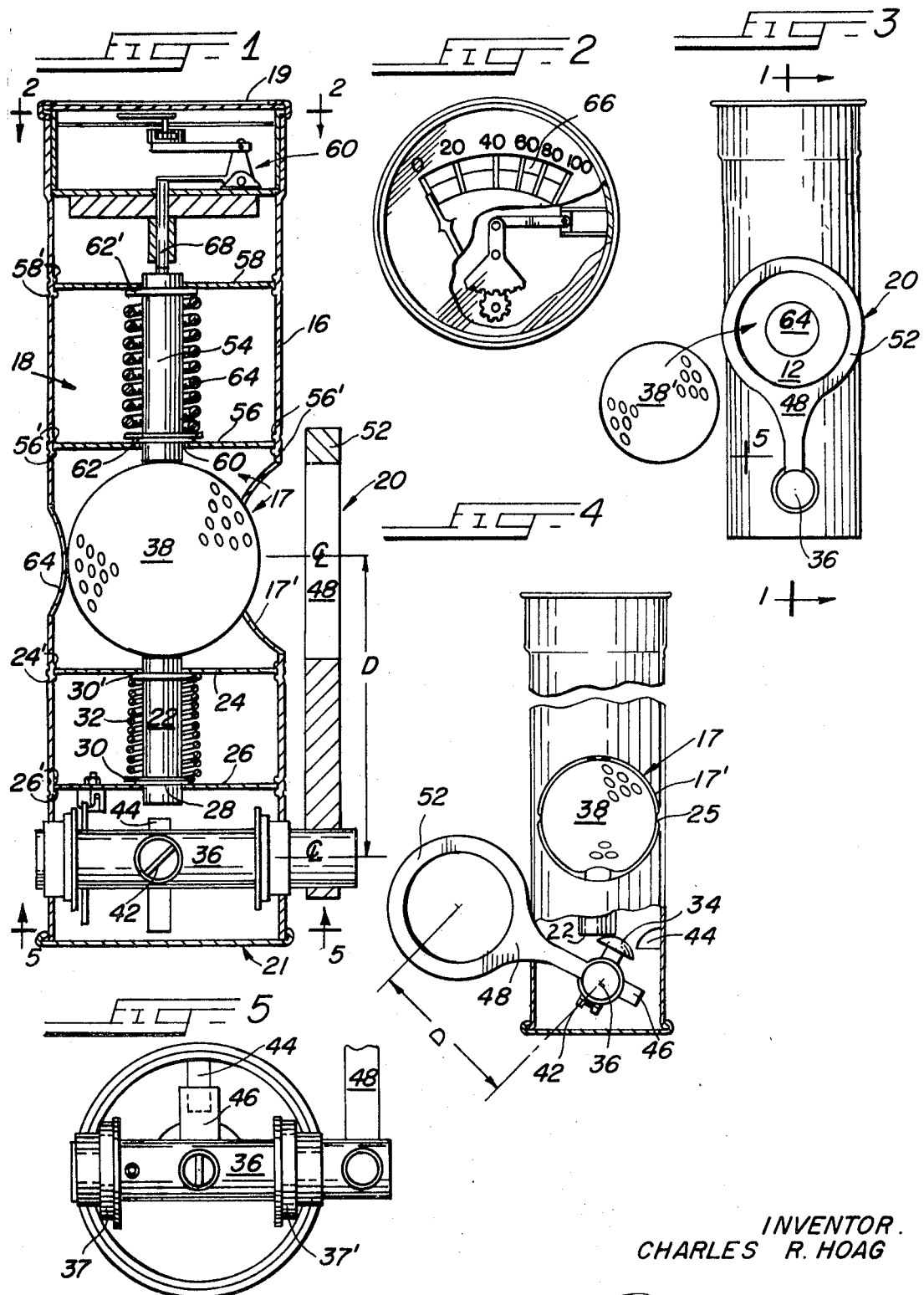
INVENTOR.
CHARLES R. HOAG
BY Rummler & Snow
ATTYS.

COMBINED GOLF BALL CONCENTRICITY AND COMPRESSION TESTER

BACKGROUND OF THE INVENTION

The playing quality of golf balls is customarily gauged by the two quantities: (1) ball concentricity, and (2) ball compressibility, and it is the practice in the trade to grade them on the basis of a test according to a particular formula. One formula of the trade for the golf ball compression test comprises initially subjecting the ball to a given load and recording the ball deformation during a second stage of load compression, the deformation occurring the first loading stage being disregarded. The purpose of this two-stage load application test is for the purpose of insuring that the ball is securely clamped by the anvils before the actual measure is taken.

A formula for testing golf balls for out-of-roundness comprises checking the concentricity of the golf ball. Concentricity is an important factor related to a good game of golf, for if the ball is elliptical or egg-shaped, a driven ball will not fly straight and true and putting on the green will be nigh impossible. Likewise, in the game of golf, ball compression is an important index often related to the player's handicap. Professional players generally use balls rated 100, low handicap players may use only 80 or 90 compression balls, while average players use those below the latter. Ball compression permits the player to select the correct ball as to hardness for weather conditions and it is also an index of the condition or age of the ball and tells the discriminating player when it is time to discard a ball for play.

SUMMARY OF THE INVENTION

The primary object of this invention is to provide a simple, portable instrument or gauge of a design such that it can be conveniently used by golfers to check the playable condition of their golf balls according to a set of fixed standards. This instrument should be of a size and shape such that it is easily portable and extremely easy to use. The device provides for the combined check of golf ball concentricity and compressibility in a related manner such that the operation of checking for ball concentricity is functionally a part of the operation of inserting the ball in the instrument for compressibility check.

Another object of this invention is to provide the combination of a go-no-go ring gauge means for measuring golf ball concentricity as part of the actuating handle of the device which is required to measure the golf ball compressibility. The device is constructed so that the golf ball cannot be checked for compressibility alone. The ball must first pass the concentricity test. This feature is made possible by coordinating the go-no-go ring gauge position relative to the ball insertion hole leading to the ball compressibility check chamber so that only when the go-no-go gauge is center-lined with the ball insertion passageway can the ball gain access to the compression check chamber. An anvil, movable a predetermined distance in the direction of the compression of the ball by cam action of the device induced by the throw of the actuating handle, and a reaction anvil, axially spaced on the opposite side of said ball compression check chamber thereof, presents the only combination of these elements which will permit ball entrance through the go-no-go ring gauge to the compressibility check chamber when the go-no-go gauge is so axially aligned with the ball insertion passageway. All other relative positions of these two elements present a blockage situation to the insertion of the ball to the compression check chamber because the distance between anvils will not so permit. Thus, when the ball is checked by passage through the go-no-go ring gauge, only those balls which are satisfactorily concentric will have been passed on to be positioned between the opposed anvils for the compression check.

BRIEF DESCRIPTION OF THE DRAWINGS

FIG. 1 is a vertical cross-sectional side view of the gauge along line 1—1 of FIG. 3;

FIG. 2 is a view of the gauge along line 2—2 just below the top of the gauge of FIG. 1 showing the dial indicator with golf ball compression indices inscribed thereon;

FIG. 3 is a front view of the go-no-go ring gauge for ball concentricity measurement center-lined with the insertion passageway leading to the ball compression check chamber with a ball ready to be inserted therein;

FIG. 4 is a fragmented front view of the gauge showing the apertured handle partially actuated and showing initial movement of the lower anvil; and FIG. 5 is a fragmented bottom view along line 5—5 of FIG. 1 of the gauge showing the journaled cam shaft mounting the apertured handle and the adjustable cam screw.

DESCRIPTION OF THE PREFERRED EMBODIMENT

Referring now to FIG. 1, it will be seen that the combination of golf ball concentricity gauge and golf ball compression instrument comprises a cylindrical tube or canister 16, preferably constructed of lightweight metal such as aluminum and weighing substantially no more than one pound, having ball compression test chamber 17 located between upper end 19 and lower end 21 supporting a golf ball compression registering assembly 18 therein and a ball concentricity measuring assembly 20 to one side thereof.

Ball compression registering assembly 18 is comprised of moving anvil 22 slidably mounted in and extending through spaced bulkhead walls 24 and 26 axially located relative to cylindrical canister 16 having snap ring 28 mounted thereon adjacent bulkhead wall 26. Snap ring 28 supports washer 30 which is concentrically mounted on anvil 22. Spaced bulkhead walls 24 and 26 are dimply mounted as at 24' and 26' in the wall of canister 16 intermediate ball insertion passageway 17' and lower canister end 21. The distance between bulkhead walls 24 and 26 is critical and is closely held. The same is true for the distance of these respective walls to the center line of ball insert passageway 17'.

A light spring 32 is mounted coaxially with anvil 22 and compressed between and acting to urge washer 30 on anvil 22 from washer 30' adjacent to bulkhead wall 24 so that the slidable axial movement of anvil 22 toward ball compression check chamber 17 during compression test of the ball comes by the lifting action of cam 34, bearing on anvil 22 as shown in FIG. 4. Cam 34 is rotatably supported by shaft 36 journaled in and adjacent to end 21 of canister 16 at a distance D from the center of ball passageway 17' and also the center of the go-no-go ring 52. This distance is also critical and must be held. Shaft 36 is endwise retained in wall of canister 16 by spaced snap rings 37 and 37' as shown in FIG. 5.

The slidable axial movement of anvil 22 is resisted by the compression of spring 32 with the effect that anvil 22 tends always to be restored to open position ready for insertion of golf ball 38 on anvil 22. Ball compression check chamber 17 has circumferential dimpled ring 25 shown in FIG. 4 to hold ball 38 on coaxial line of centers of anvils 22 and 54. Cam 34 is provided with screw adjustment 42 for calibrating the device. This calibration is made at the factory before the device is shipped. A stop 44 is mounted to the wall of canister 16 midway between journaled ends of shaft 36 adjacent the lower end 21 of canister 16 serving to limit the arc of action of cam 34 on shaft 36 to about 90° from full anvil open position ready for ball insertion to full compression test position. Contact action of arm 46 mounted on and midway to the journaled ends of shaft 36 with stop 44 serves to limit this arc of action.

Shaft 36 mounts at its end outside canister 16 a pivoted actuating lever 48 fitted with go-no-go gauge ring 52 at its upper end. The ring 52 is centered a radial distance D from the axis of shaft 36, as shown in FIGS. 3 and 4. This distance is the same as distance D from the center of shaft 36 to the center of the ball insertion passageway 17', as heretofore mentioned, so that when anvil 22 is in its inoperative position ready for ball concentricity check and for insertion of ball 38 thereon, ring 52 registers direct center on center line-up with ball insertion passageway 17'. With lever 48 in this position, passage of ball 38 through ring 52 and through ball insertion passageway 17' into compression check chamber 17 is possible. When lever 48 is rotated out of register with ball insertion passageway 17' towards compression check position, as shown in FIG. 4, without a ball in the ball compression check chamber 17, it is impossible to insert a ball through passageway 17' into chamber 17 because anvil 22 has been moved upwardly closing the distance between it and anvil 54 to an amount less than the ball diameter. In this situation, entrance of the ball to chamber 17 is blocked. When lever 48 is rotated to concentricity check and ball insertion position as shown in FIG. 3, anvil 22 is in its lowest position opening the distance between it and compression registering anvil 54 by an amount slightly greater than the ball diameter permitting the entrance of the ball therein. This distance between anvils both open and closed is critical and must be closely held as the nominal diameter of a standard playable golf ball is specified to the thousandths of an inch by the United States Golf Association at 1.680 inches.

The back wall of canister 16 to side opposite of insertion passageway 17' is provided with a finger aperture 64 to forcibly eject the ball from the chamber 17 after test, if it is necessary.

Referring again to FIG. 1, compression registering anvil 54 is slidably mounted in and extends through spaced bulkhead walls 56 and 58 axially located relative to cylindrical canister 16 having snap ring 60 mounted thereon adjacent bulkhead wall 56. Snap ring 60 supports washer 62 which is concentrically mounted to anvil 54. Spaced bulkhead walls 56 and 58 are dimply mounted as at 56' and 58' in the wall of canister 16 intermediate ball passageway 17' and upper canister end 19. The distance between bulkhead walls 56 and 58 is critical and is closely held by means of the dimples 56'. The same is true for the distance of these respective walls to the center line of ball insertion passageway 17'.

The ball insertion passageway 17' is approximately midway between upper end of anvil 22 and lower end of anvil 54. The upper end of anvil 22 is spaced from lower end of anvil 54 a distance slightly greater than the diameter of a golf ball when the lever 48 with go-no-ring 52 at its end is in inoperative position for ball concentricity check. The upper end of anvil 22 is spaced from lower end of anvil 54 a distance equal to the diameter of a golf ball minus its compression when the lever 48 is shifted to operative position as for ball compression check. Lever 48 is shown partially shifted in FIG. 4.

Heavy spring 64 is mounted coaxial with anvil 54 compressed between and acting to urge washer 62 on anvil 54 from washer 62' adjacent to bulkhead wall 56 resisting the slidable movement of anvil 54 away from the compression check chamber 17 during compression test of the ball. The movement of anvil 54 further cooperates with pushrod 68 contacting said anvil thereon and adapted to register its axial movement thereby. Registration of axial movement of anvil 54 and the compression of the ball 38 is measured by conventional dial indicator gauge 60 mounted within canister 16 adjacent end 19 where the read-out is on dial index 66, as shown in FIG. 2.

Although but one specific embodiment of this invention is herein shown and described, it will be understood that details of the construction shown may be altered or omitted without departing from the spirit of the invention as defined by the following claims.

I claim:

1. A gauge for the combined checking of golf ball concentricity and compression comprising:
   a. a canister having a side wall and upper and lower ends and a ball insertion passageway therebetween,
   b. a ball compression test chamber within said canister in communication with said ball insertion passageway,
   c. a ball moving and a ball compression registering means within said canister mounted below and above said ball compression test chamber, respectively,
   d. an operating lever pivotally mounted adjacent to the side wall and adjacent the lower end of said canister,
   e. a go-no-go ring gauge mounted on said operating lever concentric with the ball insertion passageway when the lever is in position for ball concentricity check and ball insertion to the compression test chamber,
   f. a cam means mounted on said lever operationally connected with the ball moving means,
   g. a means provided for ball compression test only after said ball passes the ball concentricity check, and
   h. a read-out means operationally connected to said ball compression registering means for golf ball compression measurement.

2. The gauge of claim 1 wherein the means provided for ball compression test only after said ball passes the ball concentricity check comprises ball moving and ball compression registering anvils extending into said ball compression test chamber and spaced a distance less than the standard diameter of a playable golf ball when the go-no-go gauge ring is not lined up with the ball insertion passageway.

3. A gauge for the combined checking of golf ball concentricity and compression comprising a cylindrical tube having an upper end, a lower end and a side wall, a ball insertion passageway in said side wall substantially intermediate said upper and said lower end of said tube, a go-no-go ring adjacent the side wall of said tube centered on the ball insertion passageway when the gauge is inoperative ready for ball concentricity check, a lever pivotally mounted subadjacent the lower end of said tube mounting said go-no-go ring, a cam within the lower end of said tube operationally connected to the free end of said lever when the gauge is operative ready for ball compression check, a compression chamber within said tube centered on the ball insertion passageway, two lower spaced bulkhead walls fixedly mounted to and within the side walls of said tube below said compression chamber, a moving anvil slidably mounted in and axially extending through said lower spaced bulkhead walls actuated by said cam, a fastener mounted on the moving anvil adjacent the lower one of said lower spaced bulkhead walls, a washer supported by the fastener concentric to the moving anvil, a light spring coaxially mounted on said moving anvil compressed between and acting to urge apart said washer from the upper one of said lower spaced bulkhead walls, two upper spaced bulkhead walls fixedly mounted to and within the side walls of said tube above said compression chamber, a registering anvil slidably mounted in and axially extending through said upper spaced bulkhead walls, a fastener mounted on the registering anvil adjacent the lower of these upper spaced bulkhead walls, a washer supported by the fastener concentric to the registering anvil, a heavy spring coaxially mounted on said registering anvil compressed between and acting to urge apart said washer from the upper one of said upper spaced bulkhead walls, a push-rod operationally connected to said registering anvil and slidably mounted within the upper end of said tube, a conventional dial gauge indicator mounted within the upper end of said tube operationally connected to the push-rod to read out the compression of said golf ball.

* * * * *